United States Patent [19]

Roberts

[11] 3,908,062
[45] Sept. 23, 1975

[54] FIRE-RESISTANT, COMPOSITE PANEL AND METHOD OF MAKING SAME

[75] Inventor: James R. Roberts, Palatine, Ill.

[73] Assignee: United States Gypsum Company, Chicago, Ill.

[22] Filed: Jan. 21, 1974

[21] Appl. No.: 435,071

[52] U.S. Cl. .............. 428/282; 156/39; 428/284; 428/537; 428/539
[51] Int. Cl.² .............. B32B 13/14; B32B 13/08
[58] Field of Search .................... 161/39–44, 161/403, 82, 83, 158, 188, 270; 52/344, 443, 612, 613, 622, 630, 745, 746; 181/33 G, 33 GA; 156/39, 42, 44; 428/282, 284, 537, 539

[56] References Cited
UNITED STATES PATENTS
| | | | |
|---|---|---|---|
| 1,943,757 | 1/1934 | Delaney | 161/115 |
| 3,192,098 | 6/1965 | Phillips | 161/41 |
| 3,216,167 | 11/1965 | Roberts et al. | 161/114 |
| 3,830,687 | 8/1974 | Carlo-Re et al. | 161/403 X |

Primary Examiner—William J. Van Balen
Attorney, Agent, or Firm—Donnie Rudd; Stanton T. Hadley; Kenneth E. Roberts

[57] ABSTRACT

A fire-resistant, composite panel comprising a core of rigid mineral fiber board having on one or both of its surfaces a layer of gypsum material bonded thereto, and in some embodiments, a layer of paper bonded to one or both of the layers of gypsum material opposite the core. A method of making a fire-resistant, composite panel including applying a thin layer of a settable gypsum slurry to one or both surfaces of a rigid mineral fiber board, and alternatively, applying layers of paper to one or both of the thin layers of gypsum material opposite the surface of the rigid mineral fiber board, and in either case, applying heat to the layer or layers of gypsum material to cure it.

10 Claims, 6 Drawing Figures

FIRE-RESISTANT, COMPOSITE PANEL AND METHOD OF MAKING SAME

BACKGROUND OF THE INVENTION

1. Field of the Invention

This invention relates to composite sheet material or panels useful in construction, and particularly to such panels of a fire-resistant nature which are useful in constructing walls and partitions.

2. Description of the Prior Art

In the past, many attempts have been made to create lightweight rigid panels for use in constructing permanent or demountable partitions or walls in homes and buildings. With modern high-rise construction becoming more prevalent, it has become even more necessary today than ever before to use panels of that type which exhibit good fire-resistance so that they will pass the requisite fire tests and will withstand the conditions to which they are subjected during intense fires in such buildings. Gypsum material has long been utilized in the formation of panels for resisting fire, either in the form of so-called "wet" walls or gypsum plaster on lath or so-called "drywalls" made of gypsum wallboard panels fastened to a supporting skeletal structure or framework formed of wood or metal members. The gypsum wallboard generally comprises a core of gypsum having on its outer surfaces a layer of relatively heavy kraft paper. In a fire, the paper may support combustion for a limited period of time but the gypsum core resists the fire while releasing its water of hydration and therefore has a fairly predictable burn-through time during which it prevents the passage of fire.

Another material which has been used to a great extent in the construction of panels as well as ceiling tile and insulation slabs and batts is a fibrous material known as mineral wool or rock wool which consists of fibers formed by a blast of steam against molten slag thrown from a spinning wheel. Such fibers have heretofore been water-felted into layers or batts, oftentimes with other additives and fillers, and simultaneously or subsequently treated with a binder to form rigid slabs, batts or panels upon drying and curing. Because of the composition of the mineral wool, generally in the form of complex silicates and oxides, such mineral fiber materials often exhibit relatively high melting points and thus are able to withstand substantial exposure to fires before failing after a period of time or after quite high temperatures are attained.

The advantage of combining these two materials to extract some of the good properties of each was early recognized; for example, see U.S. Pat. No. 1,943,757 issued on Jan. 16, 1934 to Delaney which disclosed the incorporation of a soft flexible fabric of mineral wool as a thin inner layer in a panel of gypsum wallboard for use in paneling rooms which were desired to be more soundproof. In that instance, the mineral wool was not held together by a binder and served only as a sound insulating medium, while most if not all of the strength of the panel was provided by the gypsum material and the paper sheets on one or both surfaces thereof.

The two materials, gypsum and mineral wool, are also intimately combined with one another in making cast types of ceiling tile where a mixture of the mineral wool fibers and the gypsum slurry is cast onto a surface, allowed to set and then cut into discrete panels. Patterns are often imprinted into one surface thereof to impart decoration as well as sound absorbency. While such products are widely utilized, they do not possess sufficient strength to serve as structural panels in that the mineral wool is bound together principally by the gypsum material which is not particularly resistant to tensile forces such as those created when the panels are repeatedly subjected to the types of stress normally applied to walls and partitions. Gypsum wallboard panels derive their strength primarily from the paper cover sheets rather than from the gypsum core itself, even though the gypsum core comprises by far the greater bulk of the panel. In addition, the gypsum in such tile is "broken up" or interrupted by mineral fibers and therefor does not provide a firm hard layer having smoothness which is desirable in a wall panel which is to resemble plaster walls.

Some time ago, the inventor of the present invention discovered that a prefabricated structural panel might be constructed from the modification of a rigid or semi-rigid layer of mineral fibers which was held together with an appropriate binder, perforated, and then enclosed within an outer envelope of gypsum material. The gypsum filled the perforations or interstices formed in the mineral fiber layer and also formed firm and hard outer layers on each side of the mineral fiber layer. Several embodiments of such a product are illustrated in U.S. Pat. No. 3,216,167 issued on Nov. 5, 1965 to J. R. Roberts. However, this particular product, while possessing substantial resistance to shear forces in the plane of the panel, as might be experienced in a construction subjected to racking stresses, required considerable labor cost and material wastage in its construction, and accordingly, has been found generally uneconomical to manufacture. In addition, the amount of gypsum material included in the construction of the type of panel disclosed was greater than that often desired in panels which are to be reused and moved, such as those incorporated in demountable partition systems for use in large office buildings. These panels must be lightweight.

However, a feature basic to all of the panels illustrated in U.S. Pat. No. 3,216,167 is the inclusion of columns of gypsum material integrally connecting the layer of gypsum on one side of the perforate mineral fiber core with the layer of gypsum on the other side. While such columns may provide shear strength in the plane of the panel and may provide compression strength in a direction perpendicular to the face of the panel, it also partially destroys or reduces the sound insulating properties of the panel, since the rigid gypsum material in the column conducts sound far better than the mineral fiber material. In addition, the gypsum columns increase the weight of the panel.

It has now been discovered that a superior composite panel can be constructed using less gypsum than heretofore employed and using preformed sheets of mineral fiber board which are not modified or perforated in specialized configurations. The composite panels can be made sufficiently lightweight to enable them to be installed and moved or demounted conveniently. Not only do such panels have superior resistance to fire and sound transmission, but also such panels remarkably exhibit the appearance and characteristics of plaster walls when subjected to impact or vibration. This particular effect, though somewhat subjective, is still the highest standard which can be accorded a wall and has not heretofore been fully achieved by drywalls made of gypsum wallboard.

A principal object and advantage of this invention is to combine gypsum and mineral fiber to form a fire-resistant, composite panel having improved properties.

A further object and advantage of the present invention is to provide a fire-resistant, composite panel that is economical to commercially produce, has exceptional heat and sound insulating properties, and is lightweight, strong, readily portable and reuseable.

A particularly distinctive object and advantage of the present invention is to provide a fireproof, composite panel which exhibits the unique characteristics demonstrated by plaster walls of the wet wall type.

SUMMARY OF THE INVENTION

The invention is a fire-resistant, composite panel which comprises a core of rigid mineral fiber board, and a layer of gypsum material bonded to at least one facing surface of the core. The layer of gypsum material is preferably not more than about ⅛-inch thick and the core comprises preferably at least about 75 percent of the total thickness of the panel. Other embodiments of the invention include a layer or layers of paper bonded to the surface of at least one and perhaps both layers of gypsum material opposite the core.

The invention also is a method of making a fire-resistant composite panel which comprises the steps of applying a thin layer of settable gypsum slurry to one surface of a rigid mineral fiber board, and applying heat to the thin layer of settable gypsum to cure it. In some embodiments of the invention, a layer of paper is applied to the surface of the layer of settable gypsum prior to applying heat thereto to dry or cure the gypsum layer. In another embodiment of the method of the invention, a second thin layer of a settable gypsum slurry is applied to the surface of the rigid mineral fiber board opposite the first thin layer of settable gypsum either before or after the first gypsum layer has been set or cured. Heat is then applied to the layer or layers of settable gypsum to cure it. In addition, in other embodiments of the invention, a layer of paper is applied to the surface of the second layer of settable gypsum prior to applying heat thereto to dry or cure the gypsum layer. A preferred method of the invention involves the application of a first continuous layer of a settable gypsum slurry to the surface of a sheet of paper, the deposition of a rigid mineral fiber board on the first layer of settable gypsum, applying a second substantially continuous settable gypsum slurry on the surface of the fiber board opposite said first layer of gypsum, and the application of a layer of paper to the surface of the second layer of settable gypsum. In this embodiment of the invention, heat is applied to the resulting composite panel to dry and cure the layers of settable gypsum.

DESCRIPTION OF THE DRAWINGS

The above and additional objects and advantages of the present invention will become apparent from the following description thereof, taken in conjunction with the following drawings, wherein.

DETAILED DESCRIPTION OF THE PREFERRED EMBODIMENTS

Figure 1:
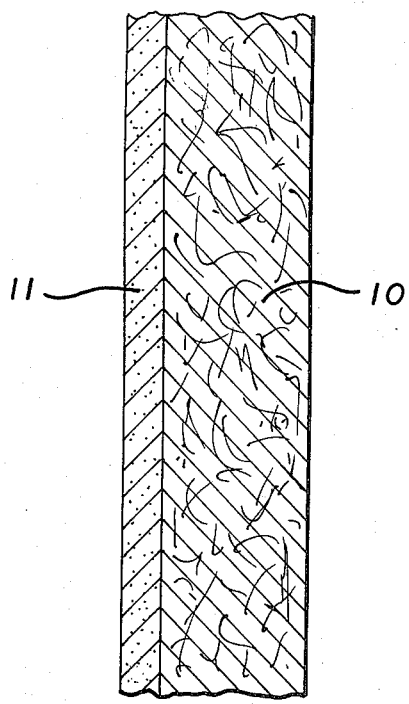
FIGS. 1 through 4 are cross sectional views of composite panels of the present invention.

Referring now to FIG. 1 of the drawings, an embodiment of the composite panel of the present invention is shown which comprises a core 10 of rigid mineral fiber board and a relatively thin layer 11 of gypsum material bonded to one facing surface of the core 10. The bond between the core 10 and the layer 11 is one resulting from the casting, setting, drying and curing of a settable gypsum material forming layer 11 onto the surface of the mineral fiber board core 10. It is both a combination of physical bonding, due to adherence of the gypsum material to surface irregularities in the mineral fiber board core, as well as chemical in nature due to bonding or adherence between the gypsum material and the material comprising the mineral fiber board core.

The core 10 comprises a substantially solid water-felted sheet, batt or slab of mineral wool, held together in substantially rigid form by a water-activated cellulosic binder. By "rigid," it is meant that the core resists deformation when subjected to flexural stresses and tends to hold its shape. However, it is not intended to exclude cores or materials used therefor which will blend or flex very slightly under stress, but which retain and exhibit their strength, resistance to deformation and general structural shape. The core 10 preferably includes some perlite as well, where higher hardness levels are desirable, as where the composite panels will be subjected to compression. The mineral wool in the sheet or slab comprising the core 10 comprises fibers formed in well-known and conventional employed mineral wool production processes from blast furnace slag and the like. The precise composition of the particular mineral wool fibers utilized is not critical to the invention providing that they generally comprise materials having a melting point higher than that of ordinary glasses so that they provide greater fire resistance when exposed to fire or to elevated temperatures. The mineral wool is preferably treated to remove as much shot or bead as possible before it is formed into the rigid mineral fiber boards.

Although many different water-activated cellulosic binders would be suitable for use in the present invention, a preferred form of such binder is prepared by forming a slurry or furnish of cellulosic material, preferably of unbleached waste kraft paper. The slurry is then gelatinized by passing it through a series of refining and gelatinizing steps to attain a suitable freeness. It has been found that a suitable water-activated cellulosic binder of this type for forming the mineral fiber core 10 has a Schopper-Riegler freeness of less than 100, and preferably less than 90.

The perlite, if employed, should be the well-known thermally expanded product which is available in a variety of mesh sizes. Generally mesh sizes less than 8 mesh are suitable, although this is not critical as the products being formed therefrom are disposed generally on the interior of a wall or partition and are either covered by a layer of gypsum, or not exposed to view. Obviously, other materials may also be employed in the core layer such as clays and other types of fillers. Preferably such clays are of the ceramic type, are non-swelling, and have a high proportion of silica and alumina. Such clays might comprise fire clays, balls clays, and the like, and generally improve the fire-resistance of the product.

The exact composition of the mineral fiber board used as the core 10 of the present invention is not critical. For example, a suitable mineral fiber board core for use in the present invention may contain from about 5 to about 85 percent by weight of mineral wool and from about 10 to about 30 percent by weight of a water-activated cellulosic binder. The amount of perlite included might vary from about 5 to about 80 percent by weight. Preferably the products contain from about 20 to about 85 percent by weight mineral wool, from about 5 to about 50 percent by weight of perlite and from about 10 to about 30 percent by weight of cellulosic binder. However, to improve the strength, and sound transmission resistance of the panel, it is desirable to use higher amounts of mineral wool, that is, at the upper ends of the above ranges.

Of course the core may also optionally contain certain additives in addition to the components mentioned above in order to obtain optimum properties and processing characteristics. For example, boric acid may be used in amounts up to about 3 percent by weight, and preferably from about 0.25 to 2 percent to impart even better fire resistance. Wax may be employed in amounts up to about 2 percent by weight although preferably comprising from about 0.25 to about 1 percent. The wax utilized is usually in the form of an emulsion or dispersion, and may be one or more of several varieties, such as, for example, microcrystalline, paraffin, petroleum, synthetic waxes, etc. Alum may also be used to obtain superior processing and product characteristics for the core, the alum being present in an amount to about 0.5 to about 1.5 percent.

The thin layer of a settable gypsum slurry may be formed from any slurry of calcium sulfate hemihydrate although it is highly desirable to use the form of gypsum known as alpha gypsum which is described in U.S. Pat. No. 1,901,051 issued to Randel et al. Such a form of gypsum has a higher strength and density than other forms of gypsum. In some embodiments, the gypsum layer 11 may be rendered insensitive or resistance to water by known techniques. For example, the water resistance may be brought about by adding asphalt and wax to the calcium sulfate hemihydrate slurry in accordance with the teachings of U.S. Pat. No. 2,432,963 to Camp. It is also possible to include in the layer of settable gypsum material a small amount of portland cement such as described in U.S. Pat. No. 2,292,616 issued to Dailey.

The product of FIG. 1 combines the firmness and high density of the gypsum layer 11, forming an attractive, smooth, hard, outer panel surface, with the thermal resistance and sound absorbency of the mineral fiber core 10 to provide a panel suitable for use in forming walls where only one side of the panel is to be exposed. The gypsum layer 11 provides a hard outer surface which resists forces and knocks, and which, surprisingly, gives the panel the appearance and physical and acoustical properties of solid gypsum when struck or touched. This is quite surprising when it is realized that the amount of gypsum used in the panel is quite small. On the other hand, since the panel comprises principally lower density mineral fiber board, it is much more lightweight than would be ordinary gypsum board or a plaster wall of equal thickness. The material has the requisite strength and workability to be used and applied by techniques similar to those utilized with ordinary gypsum wallboard. It can be manufactured by continuous or intermittent production methods on production lines fairly similar to those conventionally used for gypsum wallboard, providing they are modified to allow the insertion of a series of rigid mineral fiber boards as required.

It has been found that the panels of the present invention exhibit substantially high fire protection than is experienced with ordinary gypsum wallboard which, due to the precise thickness of gypsum core therein as the fire resistant material, have a predictable burn-through time based on the time required to remove the water of hydration from the gypsum core. In the panel of the present invention, the burn-through time is greater, since the gypsum layer may be burned off in a predictable time, but the core of mineral fiber board resists higher temperatures for longer periods of time, since it does not release water of hydration which bonds it structurally together, but rather requires substantial disintegration and melting of the high melting point mineral fiber therein to destroy it. In this way, it also provides a further advantage over the panels of U.S. Pat. No. 3,216,167 in that the gypsum, once burned off, left large holes in the mineral fiber core through which the fire could pass.

It has been found that the above-mentioned properties can be obtained with a wide variation in a relative thickness of each of the layers 10 and 11 of the panel. However the most preferable form of the panel involves a core having a much greater thickness than the gypsum layer, and in most instances it is preferred that the core 10 comprise at least about 75 percent of the total thickness of the panel while the layer 11 of gypsum is much less, typically being on the order of ⅛-inch thick or less. Surprisingly, when the layer 11 of gypsum material is only about 1/16-inch in thickness, the panel still gives the impression that it comprises solid gypsum to the casual observer feeling and observing the panel and knocking on the surface thereof.

Figure 2:
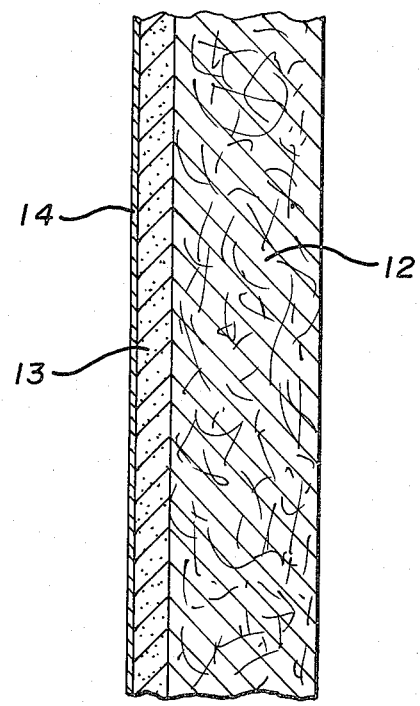

FIG. 2 illustrates a form of the composite panel of the present invention in which a layer 14 of paper has been applied over the exposed surface of the layer 13 of gypsum material opposite the core 12 of mineral fiber board to both protect the layer 13 of gypsum material as well as to provide a smooth surface thereover for uniform decoration. Obviously, the paper cover sheet 14 may also be rendered water resistant by treating with petrolatum as taught by U.S. Pat. No. 2,560,521 issued to Camp. The paper layer 14 may also include or comprise other types of decorative facings, either in place of the cover sheet 14 or in addition thereto placed over the cover sheet 14, such as plain or embossed plastic, foil, paper, or paint. The addition of the layer 14 as well as other decorative layers clearly increases the strength of the product and provides an additional layer for preventing the transmission of sound through the panel.

Figure 3:
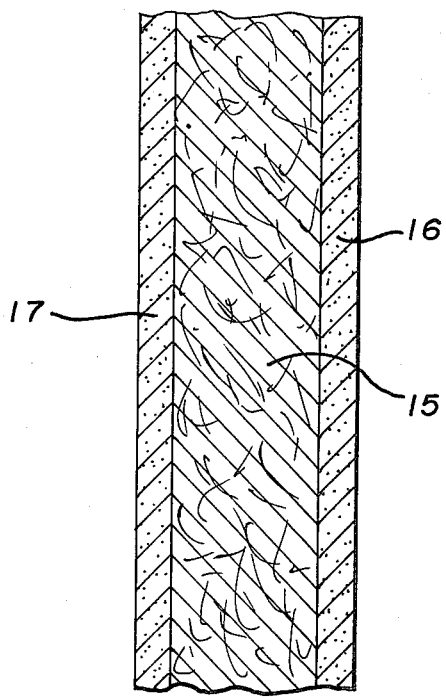

FIG. 3 of the drawings shows an additional embodiment of the composite panel of the present invention in which a second layer 16 of settable gypsum material has been applied to the side of the core 15 of mineral fiber board opposite the first layer of settable gypsum material. This embodiment is useful where both sides of the panel will be visible, as where a wall or partition or other structure comprising merely the thickness of the composite panel of the invention is to be constructed. This panel similarly exhibits all of the properties attributed to the panel shown in FIG. 1 except that it in addition possesses those same properties with respect to the opposite surface thereof as well.

Figure 4:
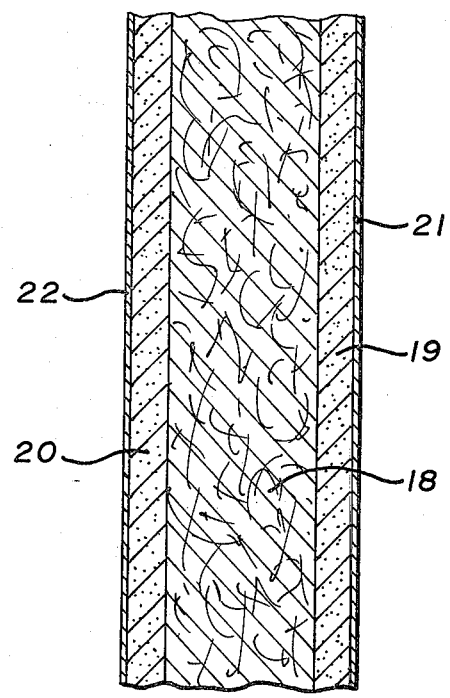

FIG. 4 illustrates a further embodiment of the composite panel of the invention wherein layers 21 and 22 of paper are placed on the outer surface of each of the layers 19 and 20 of gypsum material to totally enclose the core 18 of mineral fiber board. This renders both surfaces of the resulting composite panel susceptible of decoration, finishing, or other treatment. In this case, the paper layers 21 and 22 on opposing sides of the composite panel greatly increase its strength and give it beam-like properties. Thus, the paper layers 21 and 22 provide the tension while being held apart by a core 18 and gypsum layers 19 and 20 which are quite resistant to shear.

A number of different specific forms of apparatus could be devised to manufacture the above-described products by the method of the invention. However, referring now to FIG. 5 of the drawings, one form of such apparatus is illustrated which may be used to perform some embodiments of the method of the present invention. In particular, the apparatus shown in FIG. 5 might be used to carry out the method for forming either the composite panel shown in FIG. 1 or the composite panel shown in FIG. 3.

The apparatus includes a long continuous conveyor belt 23 supported by two spaced rotated mounted drums 24 and 25, at least one of which is driven (by means not shown). The upper stretch or flight of the conveyor belt 23 is supported at various points along its length by spaced bed plates 26 and 27 which are horizontally disposed and comprise firmly supported flat plates having a smooth upper surface over which the conveyor belt 23 passes. The belt 23 is thereby rigidly supported in a firm flat plane. Other rollers (not shown) may be disposed at convenient points along the path of the belt 23 to provide additional support. A first mixing hopper 28 containing a settable gypsum slurry is disposed just above the feed end of the upper flight of the conveyor belt 23. The trailing end of the mixing hopper 28 includes a forming plate 30 which is vertically adjustable so that the thickness of the layer of gypsum released from the mixing hopper 28 and shaped by the forming plate 30 can be controllably varied. The bed plate 26 disposed beneath adjustable forming plate 30 provides a firm supporting surface against which the layer of gypsum material applied can be very closely regulated. This can be accomplished by techniques in a manner well-known to those skilled in the art of making gypsum panels and wallboard.

Discrete panels 31 of preformed mineral fiber board are fed onto the upper surface of the upper flight of the conveyor belt 23 and their upper surface is coated with a layer 32 of gypsum material as they pass beneath the mixing hopper 28. In order to eliminate spillage of gypsum onto the conveyor belt 23, it is preferable that succeeding panels 31 of mineral fiber board be disposed in a series and in contact with the trailing ends of preceding ones so that no gaps occur between panels 31. Otherwise some precaution must be taken to intermittently stop and start the emission of gypsum material from the mixing hopper 28 between panels 31.

Upon further travel along the conveyor belt 23, the layer 32 of gypsum material is dried or cured by exposure to heat emitted from the heat source 33, which may comprise either heat lamps or other typical heating means such as infrared lamps, gas fired hoods, and the like. Upon removal from beneath heat source 33, the resulting composite panel 34 is in the form shown by FIG. 1 of the drawings.

Figure 5:
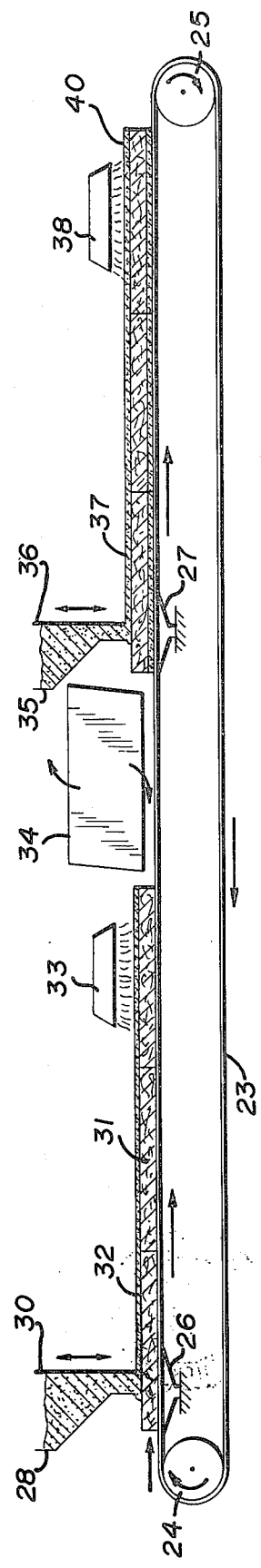
FIG. 5 is a schematic side elevation view of one form of apparatus capable of performing embodiments of the method of the present invention in order to form some of the composite panels of the present invention.

If it is desired to continue the transformation of the composite panel 34 to form the embodiment of the invention shown in FIG. 3, the panel 34 is overturned, as schematically illustrated in FIG. 5, so that the cured layer 32 of gypsum material is not disposed in contact with the conveyor belt 23. A second mixing hopper 35 containing a a settable gypsum slurry is disposed above the surface of the upper flight of the conveyor belt 23 and has a similar vertically adjustable forming plate 36 at its downstream end which monitors the flow of settable gypsum material onto the upper surface of the mineral filter board 34 passing beneath it. Again, the bed plate 27, disposed beneath the forming plate 36 of the second mixing hopper 35, provides a rigid support for ensuring that a uniformally thick layer 37 of gypsum is applied to the composite panel 34. However, upon moving further along the conveyor belt 23, the new layer 37 of settable gypsum material is dried or cured by exposure to heat emitted from a second heat source 38. At this point, the composite panel 40 is in the form of the invention as shown in FIG. 3.

As an alternative arrangement for forming the composite panel of FIG. 3, without requiring separate setting and curing of the gypsum layers and without requiring the panel to be overturned during its production, the first gypsum layer 32 may be cast upon a release surface of conventional type such as a belt or paper strip having a release coating thereon. The mineral fiber boards 31 can then be added, and their upper surface coated with a thin layer 37 of gypsum to form the composite panel of FIG. 3.

Figure 6:
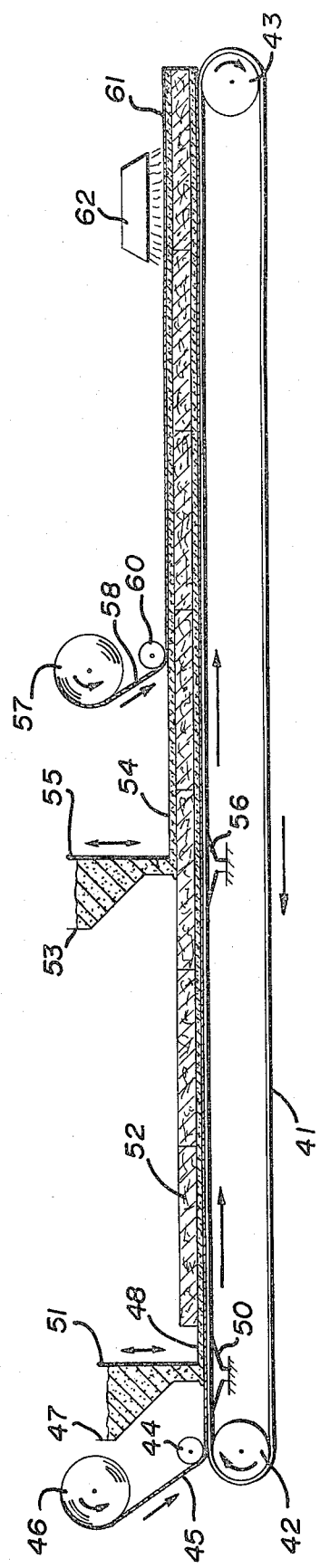
FIG. 6 is a schematic side elevation view of an alternative form of apparatus capable of performing other embodiments of the method of the present invention in order to form other composite panels of the present invention.

FIG. 6 of the drawings illustrates an alternative form of apparatus for performing other embodiments of the method of the invention, in which the composite panels illustrated by FIGS. 2 and 4 of the drawings may be formed. In this apparatus, an endless conveyor belt 41 is again supported over spaced rotatably mounted drums 42 and 43, at least one of which is driven (by means not shown). A guide roller 44 leads a strip 45 of paper from a roll 46 to the upper surface of the upper flight of the conveyor belt 41 for forming the bottom layer of the composite product. A mixing hopper 47 is disposed downstream from the guide roller 44 and is arranged to apply a layer 48 of settable gypsum material to the upper surface of the strip 45 of paper. A bed plate 50 is normally disposed below the upper flight of the conveyor belt 41 in order to ensure the formation of a uniformally thick layer 48 of gypsum thereon. The mixing hopper 47 again has a vertically movable and adjustable forming plate 51 to regulate the flow of gypsum therefrom. Downstream from the mixing hopper 47 discrete panels 52 of mineral fiber board are deposited upon the layer 48 of gypsum slurry, preferably adjacent to one another so that no gaps of any substantial magnitude occur between succeeding panels 52. At this point, heat may be applied by a heat source (not shown) to the layer 48 of gypsum material to dry and cure it and the resulting composite panel would have the form shown in FIG. 2.

However, a second mixing hopper 53 having the features of the first hopper 47 may be employed downstream therefrom and utilized to apply a second layer 54 of settable gypsum material upon the exposed upper surface of the mineral fiber board 52. The thickness of the layer 54 is controlled by a movable forming plate 55 operating against a portion of the panel and the belt 41 which passes over a bed plate 56. A second roll 57 of paper is fed in strip form 58 past a guide roll 60 and into contact with the upper surface of the second layer 54 of gypsum material to form the final layer of the composite panel 61. Thereafter, a heat source 62 is disposed above the surface of the composite panel 61 and is utilized to apply heat thereto to dry and cure the two layers 48 and 54 of gypsum material. A similar application of heat through similar means (not shown) may be made through the conveyor belt 41 as by locating these sources of heat between the upper and lower flights of the conveyor belt 41. In any event, the resulting composite panel 61 has the form of the composite panel shown in FIG. 4 of the drawings. Conventional means such as an adjustable traveling saw (not shown) may be employed to slice the resulting continuous composite panel 61 into successive lengths of composite panel material.

The bond between the paper strips above and the layers of settable gypsum material is the same bond as used in the formation of gypsum wallboard. It may be enhanced by the addition of bonding agents to either the core of the paper, or to the interface between the two during formation of the panels. Or the bond may be totally artificial, if the panels are set and cured prior to the application of the paper layers.

It is preferable in each case where a mineral fiber board is contacted with a layer of gypsum that the gypsum still be in slurry form prior to initial set so that the desired bond forms. The set of the gypsum slurry can be regulated by any one of a wide variety of accelerators and retarders to control the process.

From the above, it can be seen that the present invention provides new and improved fire-resistant, composite panels which can be formed on production equipment which is similar to that employed in the production of ordinary gypsum wallboard with some minor modifications. While panels of the present invention encompass a number of different forms, all have the common characteristics of being very fire-resistant and of having essentially a core of rigid mineral fiber board with a layer of gypsum material bonded thereto. This combination of materials is in a form that enables new and unique characteristics to be obtained. In addition, these advantages are obtainable without the use of intricate modifications of the layer of mineral fiber board as was required by many of the prior art panels. In addition, surprisingly the panels of the invention, while being easy to form, demonstrate unique resistance to sound transmission therethrough and furthermore, provide visual and physical properties closely resembling those of solid plaster walls which have not heretofore been obtainable through any of the prior art panels.

It was readily apparent from the above description of the invention that various modifications of the panels and in the particular materials utilized therein may be made within the scope of the invention. For example, many different additives may be incorporated into the mineral fiber material comprising the core as well as into the gypsum material forming the outer layers. In addition, the layer of paper material used might take many forms and be formed of many different sheet materials. In addition, many modifications may be made in the particular form of apparatus used to perform the methods of the invention. Therefore, in view of all of the above, the invention is not to be limited to the specific details described herein, except as may be required by the following claims.

What is claimed is:

1. A fire-resistant, composite panel, comprising
   a core of rigid mineral fiber board, and
   a layer of gypsum material bonded to one facing surface of said core, and
   wherein
   said core is a water-felted sheet comprising from about 5 to about 85 percent by weight of mineral wool, from about 5 to about 80 percent by weight of perlite, and from about 10 to about 30 percent by weight of a water-activated cellulosic binder, and
   said gypsum material comprises alpha gypsum.

2. A fire-resistant, composite panel according to claim 1, wherein said layer of gypsum material is not more than about 1/8-inch thick, and said core comprises at least about 75 percent of the total thickness of said panel.

3. A fire-resistant, composite panel according to claim 1, including a layer of paper bonded to the surface of said layer of gypsum material opposite said core.

4. A fire-resistant, composite panel according to claim 1, including a second substantially continuous layer of gypsum material bonded to the opposite facing surface of said core.

5. A fire-resistant, composite panel according to claim 4, including a layer of paper bonded to the surface of each layer of gypsum material opposite said core.

6. A fire-resistant, composite panel, comprising
   a core of rigid mineral fiber board,
   a first layer of gypsum material bonded to one facing surface of said core, and
   a second layer of gypsum material bonded to the opposite facing surface of said core, and wherein
   said core is a water-felted sheet comprising from about 5 to 85 percent by weight of mineral wool, from about 5 to about 80 percent by weight of perlite, and from about 10 to about 30 percent by weight of a water-activated cellulosic binder, and
   said gypsum material comprises alpha gypsum.

7. A method of making a fire-resistant composite panel, comprising the steps of
   applying a substantially continuous thin layer of a settable alpha gypsum slurry to one surface of a rigid mineral fiber board core, said core comprising a water-felted sheet comprising from about 5 to about 85 percent by weight of mineral wool, from about 5 to about 80 percent by weight of perlite, and from about 10 to about 30 percent by weight of a water-activated cellulosic binder, and
   applying heat to the thin layer of settable alpha gypsum to cure it.

8. A method of making a fire-resistant composite panel according to claim 7, including applying a layer of paper to the surface of said layer of settable alpha gypsum prior to applying heat.

9. A method of making a fire-resistant, composite panel according to claim 7, including the step of applying a second thin layer of settable alpha gypsum slurry to the surface of said rigid mineral fiber board opposite the first thin layer of settable alpha gypsum after said first thin layer has been cured, and applying heat to said second thin layer of settable alpha gypsum to cure it.

10. A method of making a fire-resistant compisite panel comprising the steps of applying a first substantially continuous thin layer of a settable alpha gypsum slurry to one surface of a sheet of paper, depositing a rigid mineral fiber board core on said first layer of settable alpha gypsum said core comprising water-felted sheet comprising from about 5 to 85 percent by weight of mineral wool, from about 5 to about 80 percent by weight of perlite, and from about 10 to about 30 percent by weight of a water-activated cellulosic binder, applying a second substantially continuous thin layer of a settable alpha gypsum slurry to the surface of said rigid mineral fiber board core opposite said first layer of settable alpha gypsum, applying a layer of paper to the surface of said second layer of settable alpha gypsum, and applying heat to the resulting composite panel to cure the layers of settable alpha gypsum.

* * * * *